United States Patent [19]

Linkner, Jr.

[11] Patent Number: 5,673,978
[45] Date of Patent: Oct. 7, 1997

[54] PRESSURE ATTENUATORS AND NETWORKS FOR ANTI-LOCK BRAKING SYSTEMS

[75] Inventor: Herbert J. Linkner, Jr., Dexter, Mich.

[73] Assignee: Kelsey-Hayes Company, Livonia, Mich.

[21] Appl. No.: 404,587

[22] Filed: Mar. 15, 1995

Related U.S. Application Data

[63] Continuation-in-part of Ser. No. 163,658, Dec. 7, 1993, Pat. No. 5,540,486.

[51] Int. Cl.$^6$ .................................................. B60T 8/34
[52] U.S. Cl. ................. 303/87; 303/113.1; 303/116.1; 303/900; 303/901; 137/513.3
[58] Field of Search .................... 303/116.1, 116.2, 303/116.4, 87, 900, 901; 137/513.3, 513.5, 513.7

[56] References Cited

U.S. PATENT DOCUMENTS

| | | | |
|---|---|---|---|
| 3,757,825 | 9/1973 | Givens et al. | 303/87 |
| 4,453,782 | 6/1984 | Arikawa et al. | |
| 4,571,009 | 2/1986 | Jones . | |
| 4,721,345 | 1/1988 | Nishimura et al. | 303/901 |
| 4,828,335 | 5/1989 | Fuller et al. | |
| 5,066,075 | 11/1991 | Kaneda et al. | |
| 5,143,428 | 9/1992 | Toda et al. | |
| 5,209,554 | 5/1993 | Beilfuss et al. | |
| 5,232,273 | 8/1993 | Eckstein et al. | 303/901 |
| 5,265,943 | 11/1993 | Kehl et al. | 303/900 |
| 5,403,077 | 4/1995 | Burgdorf et al. | 303/901 |
| 5,405,191 | 4/1995 | Nishiyama et al. | 303/901 |
| 5,460,438 | 10/1995 | Hellman et al. | 303/87 |

FOREIGN PATENT DOCUMENTS

| | | | |
|---|---|---|---|
| 0491159A1 | 11/1991 | European Pat. Off. . | |
| 1373140 | 12/1964 | France . | |
| 1963709 | 7/1971 | Germany . | |
| 4029846 | 4/1991 | Germany . | |
| 4002635 | 8/1991 | Germany . | |
| 1106759 | 4/1989 | Japan . | |
| 6171486 | 6/1994 | Japan | 303/116.2 |

*Primary Examiner*—Matthew C. Graham
*Attorney, Agent, or Firm*—MacMillan, Sobanski & Todd

[57] ABSTRACT

An anti-lock braking control system for use in vehicles contains a restrictive orifice associated with an attenuator in the master cylinder brake line and opposed, parallel check valves positioned parallel to and independent of the restrictive orifice, all of which is located at or upstream of the juncture of the pump outlet line, thus allowing high volume fluid flow to and from the master cylinder while providing high pressure pulse and vibration damping of the ABS/TCS pump and associated isolation valve, and isolating this from the master cylinder and from operator pedal feel. Preferably, the reduced size orifice comprises one or more grooves located in the conical seat of at least one and preferably both check valves, which are preferably of the check ball type. Alternatively, a traditional, generally circular cross-section restrictive orifice in parallel with the check valves, may be substituted for or used in conjunction with the aforementioned grooves or their equivalents.

13 Claims, 9 Drawing Sheets

PRESSURE ATTENUATORS AND NETWORKS FOR ANTI-LOCK BRAKING SYSTEMS

CROSS-REFERENCE TO RELATED APPLICATION

This application is a continuation-in-part of my U.S. patent application Ser. No. 08/163,658, filed Dec. 7, 1993, now U.S. Pat. No. 5,540,486 which is assigned to the assignee of the present application and which is hereby incorporated by reference.

TECHNICAL FIELD

The subject invention pertains to vehicle braking systems. More particularly, the subject invention pertains to vehicle antilock and traction control braking systems in which a single attenuator is used to isolate and damp from the master cylinder pressure pulses and vibrations emanating from the ABS high pressure pump and the isolation valve, and in which parallel opposed check valves may be utilized therewith to enhance brake pedal response.

BACKGROUND ART

Anti-lock braking systems (ABS) have become so popular they are standard on many vehicles. The use of traction control systems (TCS) is now becoming increasingly widespread as well, and it is anticipated that their use will parallel that of anti-lock braking systems. In both systems, which may be termed "vehicle control systems," rapid deployment of brake calipers or brake shoes are necessary in order to perform the intended control function. As used herein, reference to an anti-lock braking system or "ABS" system is not meant to exclude the conjunctive use of a traction control system or "TC" system, which is the more conventional application of the system, and each may be referred to collectively as an "ABS/TC" system. In anti-lock braking systems, when locking of the wheels due to over-application of brake pressure or loss of traction due to the nature of the surface, i.e., gravel, ice, or snow, is encountered, the automotive braking system rapidly pulsates the brakes between an off and an on condition, allowing maximal retention of braking ability while yet retaining the ability to steer the vehicle in a stable fashion. In traction control systems, loss of traction in a driving wheel is countered by a momentary application of brake pressure, thus restoring traction. In either case, high pressure systems are desirable to affect the rapid changes necessary to achieve the desired control.

During antilock operation, it is necessary to rapidly decrease brake pressure by pumping brake fluid from the brake cylinders back to the master cylinder. This is necessary both for decreasing brake pressures and for having this dumped fluid available for subsequent antilock cycles in a stop. The motor driven high pressure pump is actuated only when the need for high pressure brake releases are sensed by the circuitry associated with the anti-lock braking function.

Figure 1:
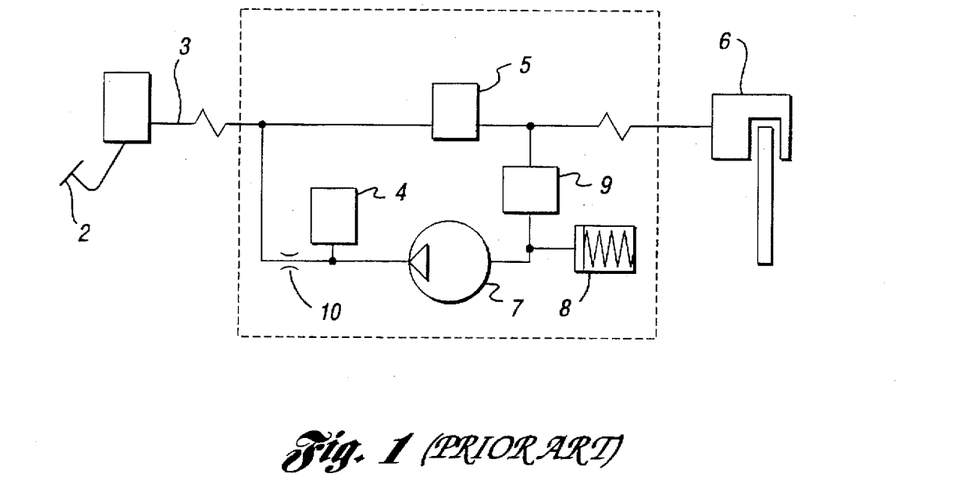
FIG. 1 schematically illustrates a conventional ABS system having a single attenuator at the outlet of the high pressure pump.

A typical anti-lock braking system is shown schematically in FIG. 1. Hydraulic fluid from the brake pedal 2 actuated master cylinder 1 flows through line 3 through normally open isolation solenoid valve 5 to brake caliper slave cylinder 6. Except for the presence of the additional normally open isolation valve, the system thus far described is similar to the normal braking system of the automobile. In an anti-lock brake system, detection of a lock condition simultaneously actuates high pressure pump 7 and closes isolation valve 5. At the same time, hold/dump valve 9, sometimes referred herein simply as a dump valve, is momentarily opened, allowing pressure to bleed from the brake cylinder to the low pressure accumulator 8. The brakes are thus momentarily released. The low pressure accumulator allows quick initial dumping or decrease of brake pressure. The pump, however, empties the low pressure accumulator to allow continued decrease of brake pressure if needed and also pumps the brake fluid back to the master cylinder for subsequent antilock cycles of a stop. To reapply the brakes during the same braking sequence, should it be necessary, pressure from either the master cylinder or the high pressure pump 7 is diverted to the brake cylinder by opening the isolation solenoid valve and closing the hold/dump valve, once again increasing brake pressure. This cycle repeats itself rapidly, resulting in rapid increases or decreases of brake pressure, thus achieving maximal braking while avoiding a locked condition. During the dump cycle when the pump is pumping brake fluid from the low pressure accumulator, fluid flows into the master cylinder and/or to the brakes. Although this system is highly effective, it is subject to a great deal of noise and vibration due to the high pressure pulses emanating from the high pressure pump, as well as the pressure spikes and rebound pulses emanating from the isolation valve and the dump valve. For example, dump valve pressure pulses commonly reach 500 to 600 psi (35 to 41 bar). Not only is the noise associated with such pressure pulses undesirable, but furthermore, the noise is indicative of vibrational mechanical strain placed on system components and lines. To minimize these vibrations it has proven useful to place an attenuator 4 on the outlet side of the pump between the pump outlet and master cylinder line, per FIG. 1. The combination of compressible fluid and/or elastomer in the attenuator cavity, in conjunction with a restrictive, reduced size orifice, shown at 10 and normally contained in the attenuator cavity or bored in a wall of the cavity, serve to reduce pressure fluctuations and vibrations from the high pressure pump.

Commonly used hydraulic systems in anti-lock braking systems utilize "eight valve designs" in which one portion of an opposed, dual piston pump supplies hydraulic fluid to two pairs of isolation and hold/dump valves, one pair for each of a front brake and a rear brake, while the other piston of the high pressure pump similarly supplies high pressure hydraulic fluid to two additional pairs of valves for the other front and rear brakes respectively, i.e. a diagonally split system. The hydraulic circuit is thus roughly divided diagonally across the vehicle with each half being driven by one side of the high pressure pump. Each side further contains an attenuator, and a low pressure accumulator.

The various solenoid actuated valves, attenuators, low pressure accumulators, and high pressure pump elements are commonly configured in a single housing of extruded aluminum into which the various components are located in appropriately machined bores. Additional internal bores provide the requisite hydraulic circuit interconnections.

The attenuators which are used to damp the vibrations and pressure pulses occurring in the conventional ABS system as seen in FIG. 1 are generally located at the output of the high pressure pump. At this location, the attenuator is effective to reduce the severity of the high pressure pulses emanating from the pump, but has virtually no effect on damping vibrations and pressure pulses originating from other components of the ABS system. The isolation and hold/dump valves, for example, contribute significantly to system vibrations, pressure pulses, and rebound pulses as they rapidly open and close during release (dump cycle) and reapplication (reapply cycle) of brakes during a complete ABS/TC cycle. The attenuator located at the outlet of the high pressure pump contributes little, if any, to damping these vibrations and pressure pulses. To improve this, as disclosed in my copending patent application Ser. No. 08/163,658, filed Dec. 7, 1993, one proposal is to employ two attenuators, one located at the high pressure pump outlet, the other located in the master brake cylinder line between the isolation valve and the master cylinder (downstream of the interconnecting pump outlet line). The necessity of supplying two attenuators in a given system not only increases component cost and assembly time, but further results in a weight penalty due to (i) the weight of the additional attenuator and (ii) the increased size of the hydraulic control unit which is necessary to accommodate the inclusion of the additional attenuator. In this respect, it should be noted that virtually all ABS/TC systems employ a dual piston pump and two sets of isolation and hold/dump valves. Therefore if dual attenuators are to be used, a total of four attenuators will be present and not merely two.

SUMMARY OF THE INVENTION

It is an object of the subject invention to utilize an ABS/TC system having a single attenuator for each high pressure pump, which is effective to not only damp the pump vibrations and pressure pulses, but which also effectively damps other vibrations and pressure pulses occurring within the system, particularly from the isolation valve, and isolates these from the master cylinder and feedback to the passenger compartment.

It is another object of the present invention to provide a check valve system in the aforementioned improved single attenuator system which improves operator brake pedal feel to eliminate what might otherwise be discerned by the operator as an increase in brake apply time as well as slow pedal retraction.

The present invention pertains to an anti-lock brake system wherein a vibration and pressure pulse damping attenuator having a flow-through design is incorporated directly into the master brake cylinder line between the master cylinder on the one hand and the high pressure pump and isolation valve on the other hand, thus effectively damping vibrations and high pressure pulses emanating from both the high pressure pump as well as from other points in the system.

The present invention also pertains to a vehicle control system containing an attenuator and associated restrictive orifice in the master cylinder brake line yet which does not restrict flow of fluid during normal braking system use. The vehicle control system of the present invention contains opposed parallel check values in the master cylinder brake line between the attenuator and the master cylinder, the check valve assembly incorporating or otherwise performing the function of a restrictive orifice.

The check valves are preferably preloaded to a level higher than the expected pressure pulses in the system, thus substantially isolating the master cylinder and brake pedal from pressure pulses and vibrations from the hydraulic control unit. At the same time, the check valve preloading is sufficiently low to allow substantial fluid flow during normal brake applications. Advantageously, the check valve which allows fluid flow from the master cylinder to the slave cylinder(s) may be preloaded to a lower level than the remaining check valve.

The above objects and other objects, features and advantages of the present invention are readily apparent from the following detailed description of the best mode for carrying out the invention when taken in connection with the accompanying drawings.

BRIEF DESCRIPTION OF THE DRAWINGS

FIG. 8a is a plot of vibrational acceleration (g) versus frequency for the ABS system of FIGS. 1 and 3a;

DESCRIPTION OF THE PREFERRED EMBODIMENTS

The components of an ABS vehicle control system are generally laid out as indicated in FIG. 1 as earlier described.

Figure 3A:
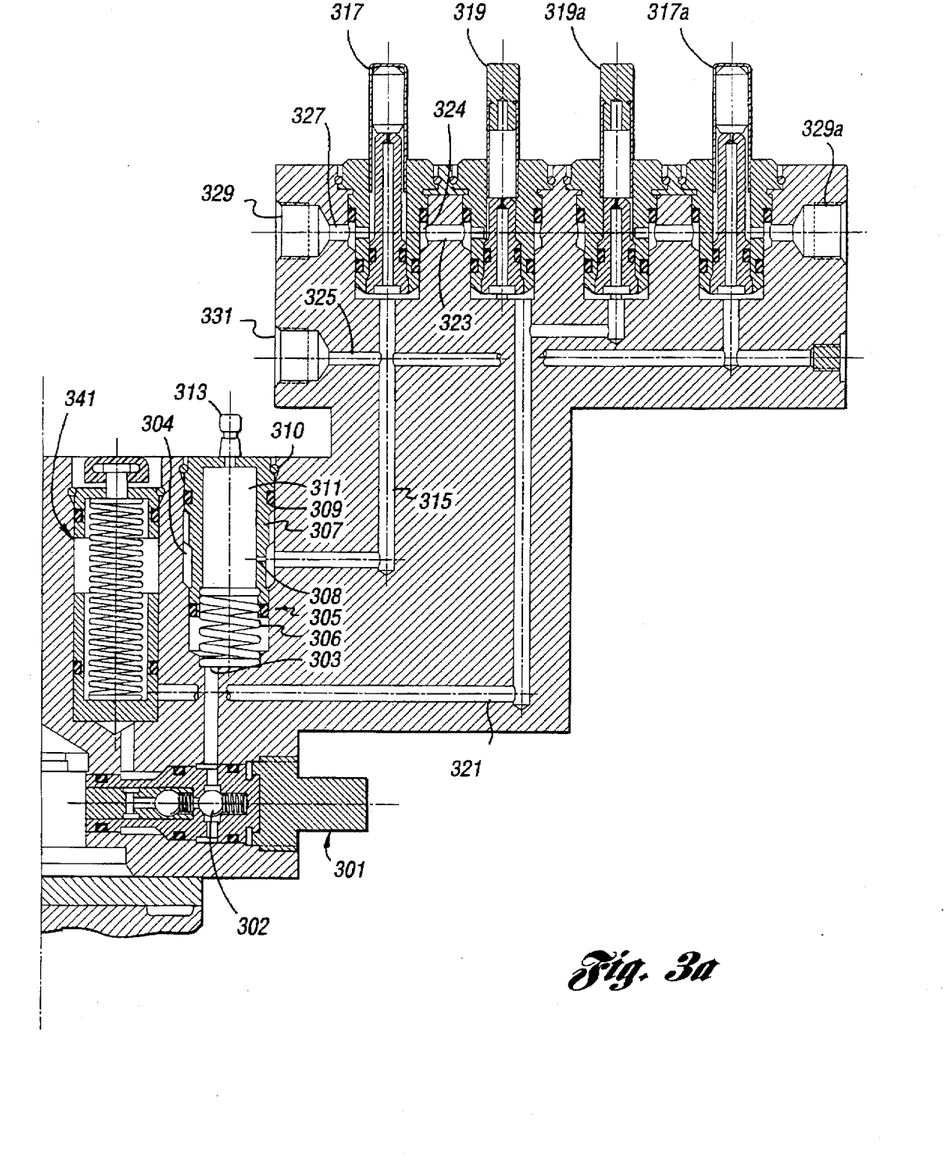
FIG. 3a is an elevation view as taken in various planes of a hydraulic control unit showing the respective components and hydraulic flow between the components for a single attenuator design of the prior art as schematically represented in FIG. 1.

The attenuators most commonly used in such a system are illustrated by the attenuator 305 shown in FIG. 3a, wherein sleeve 307 is located in a bore in the hydraulic control unit housing, and is forced outwardly of the housing by compression spring 306. Snap-ring 310 serves to retain the sleeve in the bore, while O-ring 309 seals against exit of high pressure fluid from the hydraulic control unit body. High pressure fluid enters the attenuator through entry port 303, and exits through reduced size orifice 308 located in sleeve 307. The cavity 311 maintained in the attenuator is filled with hydraulic fluid and at 313 is a bleed screw to bleed air from the system during installation and service.

The hydraulic circuit shown in FIG. 3a is an abbreviated version of a commercial system, as it does not, for simplicity of illustration, include the other half of the diagonally split system. As earlier referenced, a commercial ABS system will also have a "mirror-image" configuration, so that a total of eight valves are present.

High pressure fluid from eccentrically driven high pressure pump 301 may exit through outlet check ball 302 into high pressure outlet port 303 and from there into attenuator 305. Radial passage 304 in attenuator sleeve 307 allows communication of hydraulic fluid filled cavity 311 with passage 315 through orifice 308. Passage 315 provides a pathway for hydraulic fluid flow to normally open isolation valve 317, and from the isolation valve to the brake slave cylinder through passage 327 and threaded brake port 329. Passage 325 connects with passage 315 at a "tee" and communicates with the master cylinder port 331.

During normal braking, the high pressure pump is not running, and pressure generated in the master cylinder by brake pedal application flows into the hydraulic control unit at port 331, through normally open isolation valve 317 through front brake port 329 and ultimately, to the brake slave cylinder.

During dump cycles, the isolation valve 317 is kept closed and the hold/dump valve 319 is pulsed at a controlled rate or at some conditions is kept open, causing brake pressure to decrease at a controlled rate and brake fluid to flow from the brake chamber 6 (of FIG. 1), through chamber 324 skirting isolation valve 317, through line 323, through dump valve 319, then through line 321, to the low pressure accumulator 341. From there, it is pumped by the pump 301 to the attenuator 305 where pressure pulses are absorbed then partially dissipated by the damping orifice 308 as the brake fluid flows back to the master cylinder 1 or, if the hold/dump valve is then closed and the isolation valve opened, also back to the brakes 6.

During reapply cycles, the hold/dump valve 319 is kept closed and the isolation valve 317 is pulsed at a controlled rate or at some conditions is kept open, causing brake pressure to increase at a controlled rate and brake fluid to flow primarily from the master cylinder to the brake chambers.

In similar fashion, fluid communication is provided to and from rear brake cylinder through port 329a and isolation and dump valves 317a and 319a, respectively.

Attenuator 305 does not effectively damp vibration and pressure pulses from isolation valve 317, 317a due to the impedance of the orifice in the attenuator in the flow path between the attenuator and the isolation valve. Moreover, when servicing the system, the possibility of air being entrained within the attenuator cavity requires providing a bleed screw 313 for evacuating this air.

Figure 3B:
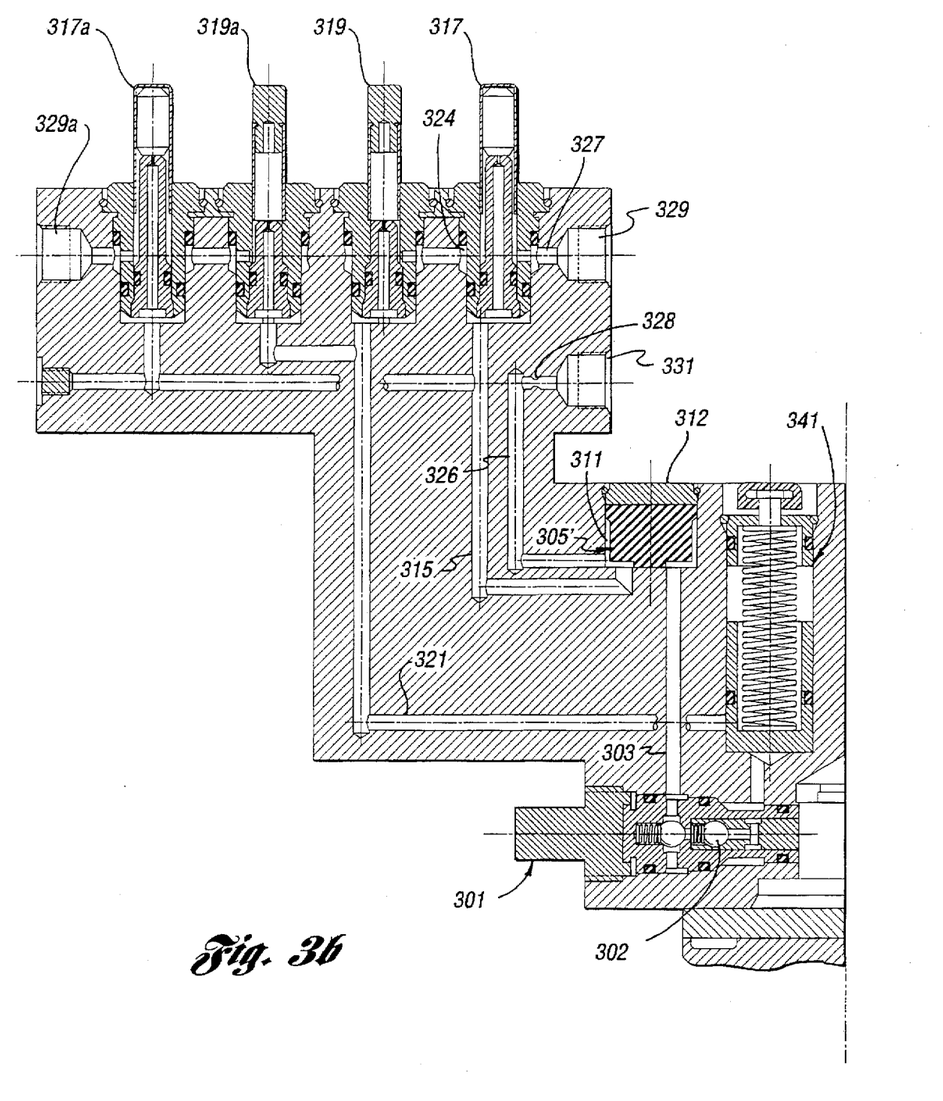
FIG. 3b is an elevation view as taken in various planes of a hydraulic control unit showing the respective components and hydraulic flow between the components of the ABS system of the present invention as schematically represented in FIG. 2.

As shown in FIG. 3b the hydraulic flow circuit of the ABS system of the subject invention includes high pressure fluid from high pressure pump 301 exiting via outlet check ball 302 into passage 303 and into attenuator 305'. Unlike attenuator 305, attenuator 305' does not contain a sleeve 307 which must be secured within the bore by tensioning spring 306 and O-ring seal 309, nor does it contain bleed screw 313. Elimination of sleeve 307 is made possible due to the fact that attenuator 305', in the most preferred embodiment, does not contain the reduced size restrictive orifice contained in attenuator 305. Rather, this damping orifice 328 has been repositioned to the bore in the housing just prior to the master brake cylinder port 331. Alternatively, it could be advantageously positioned in the hydraulic line between the hydraulic control unit and master cylinder or in the master cylinder itself. Adoption of the elastomeric, volumetrically compressible attenuator 305' allows decreasing the depth of the housing bore for attenuator 305' by approximately 50% while retaining the same working volume, i.e. elastomeric volume versus hydraulic fluid volume when there is no elastomeric member filling the attenuator cavity. Alternatively, the diameter of the attenuator 305' could be reduced while retaining an equivalent total working volume of elastomer and hydraulic fluid.

Plug 312 is bonded to the elastomeric member, and the attenuator 305' is retained within the hydraulic control unit by a snap-ring, as with attenuator 305. The elastomeric member is also provided with an annular sealing rib adjacent and contiguous with plug 312 for sealing the attenuator cavity 311. Passage 315 extends from attenuator 305' to isolation valve 317, while passage 326 extends from attenuator 305' to master cylinder port 331. Preferably, the reduced orifice 328 is located proximate to master cylinder port 331.

In normal braking, the system works as described above regarding FIG. 3(a).

In ABS operation, upon sensing wheel lock, the isolation valve 317 is kept closed and the hold/dump valve 319 is pulsed at a controlled rate or at some conditions is kept open, causing brake pressure to decrease at a controlled rate and brake fluid to flow from the brake chamber 6 (of FIG. 2) through port 329 and lines 327, 324, 321 to the low pressure accumulator 341 where it is pumped by the pump 301 to the attenuator 305' where pressure pulses are absorbed, then partially dissipated by the damping orifice 328 as the brake fluid flows back to the master cylinder 1 or, if the hold/dump valve is then closed and the isolation valve opened, also back to the brakes 6.

During reapply cycles, the hold/dump valve 319 is kept closed and the isolation valve 317 is pulsed at a controlled rate or at some conditions is kept open, causing brake pressure to increase at a controlled rate and brake fluid to flow primarily from the master cylinder to the brake chambers.

In similar fashion, fluid communication is provided to and from the rear brake cylinder through port 329a and isolation and dump valves 317a and 319a, respectively.

When the attenuator 305 is located at the output of the pump as shown in FIGS. 1 and 3(a), it attenuates pulses mostly from the pump 301 and from the hold/dump valve 319 as the output of this valve goes through the pump. In this location, the attenuator 305 does little to attenuate pulses from operation of the isolation valve 317. Rather, the attenuator 305 is in a passage that does not receive flow from the master cylinder to the brake chamber and thus is not easily bled.

Figure 2:
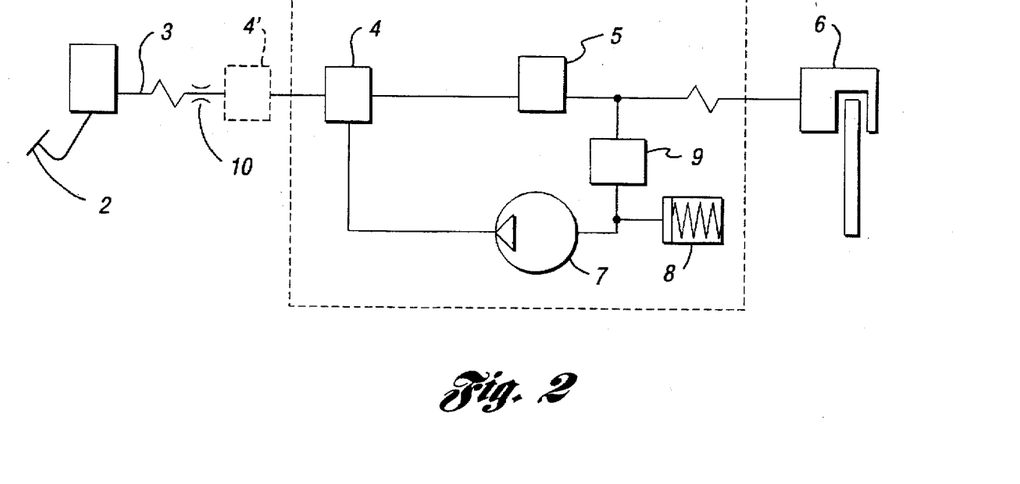
FIG. 2 schematically illustrates an ABS system with improved damping by relocation of the attenuator into the master cylinder line at the pump outlet line confluence with the master cylinder line in accordance with the present invention.

When the attenuator is located in the master cylinder line 3, preferably at the junction of the pump, isolation valve, and master cylinder lines with the orifice between the attenuator and the master cylinder, per the present invention as shown in FIGS. 2 and 3(b), it attenuates, as before, pulses from the pump and from the hold/dump valve and also attenuates pulse caused by operation of the isolation valve solenoid.

The effectiveness of the present invention in attenuating both the high pressure pump and isolation valve may be illustrated by comparing FIGS. 4–8. The hydraulic circuit for FIGS. 4a, 5a, 6a, 7a and 8a utilize a single attenuator located conventionally as shown in FIG. 1, filled with hydraulic fluid, with a 0.020 inch orifice. The hydraulic circuit for FIGS. 4b, 5b, 6b, 7b and 8b utilize the subject invention hydraulic circuit of FIG. 2, with the same size attenuator, and an 0.025 inch orifice.

Figure 4A:
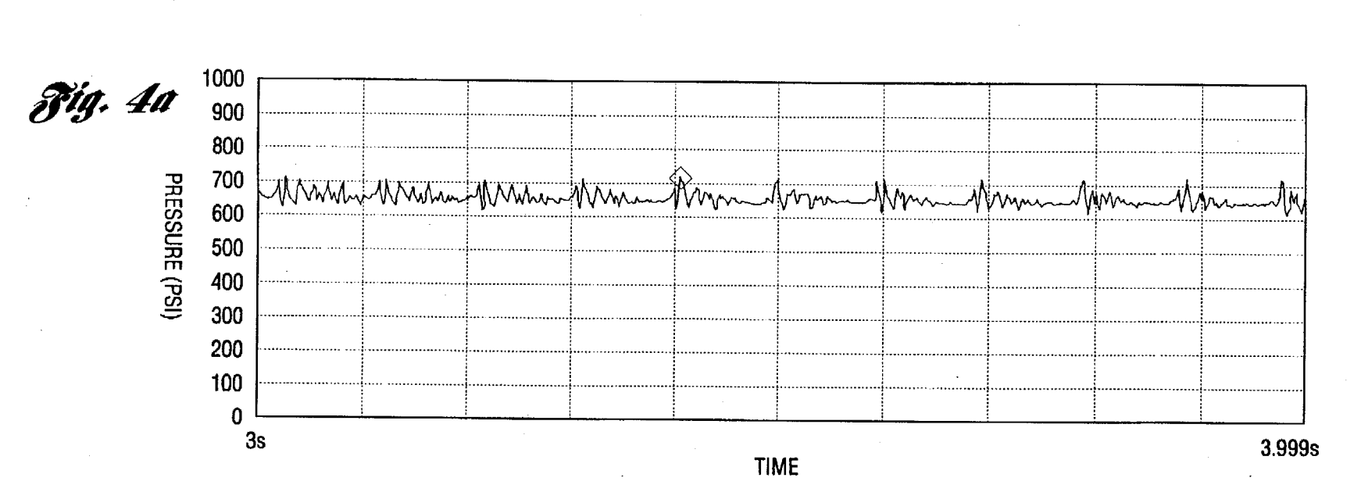
FIG. 4a is a plot of pressure versus time for the ABS system of FIGS. 1 and 3a during the dump cycle.
Figure 4B:
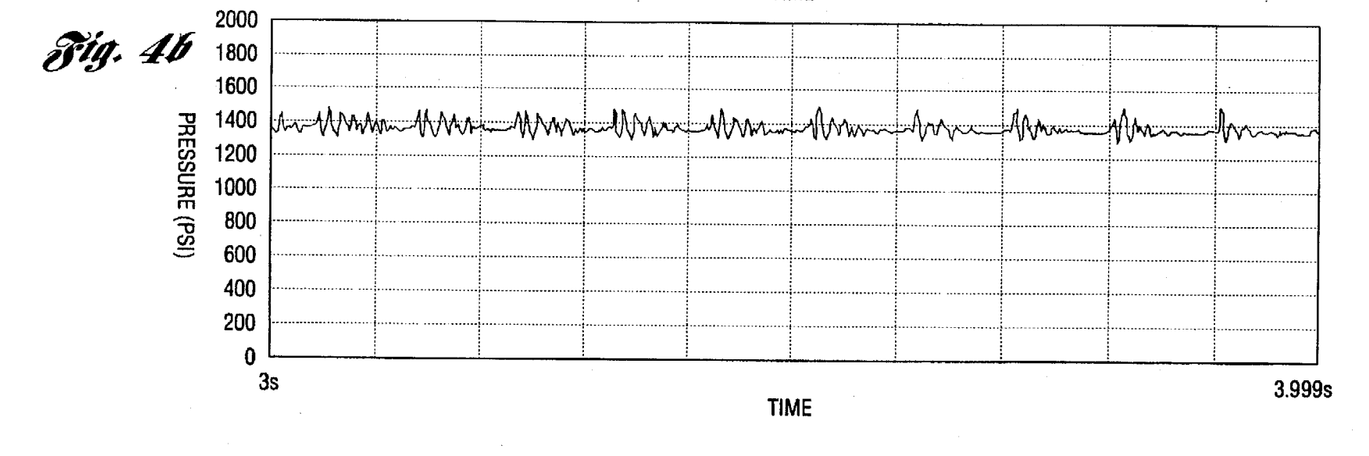
FIG. 4b is a plot of pressure versus time for the ABS system of FIGS. 2 and 3b during the dump cycle.

In FIG. 4a, the pressure pulses in the master cylinder line during the dump mode, i.e. with the high pressure pump running, the isolation valve closed and the hold/dump valve open, measured at the hydraulic control unit, are plotted against time. The hydraulic circuit illustrated in FIG. 2 is used. In FIG. 4b, the same plot illustrates the use of the subject invention with hydraulic flow through attenuator 305' as illustrated in the hydraulic circuit of FIG. 3b. As can be seen, the plots are quite similar, indicating the effectiveness of the attenuator in its revised location in attenuating pressure fluctuations emanating from the pump.

Figure 5A:
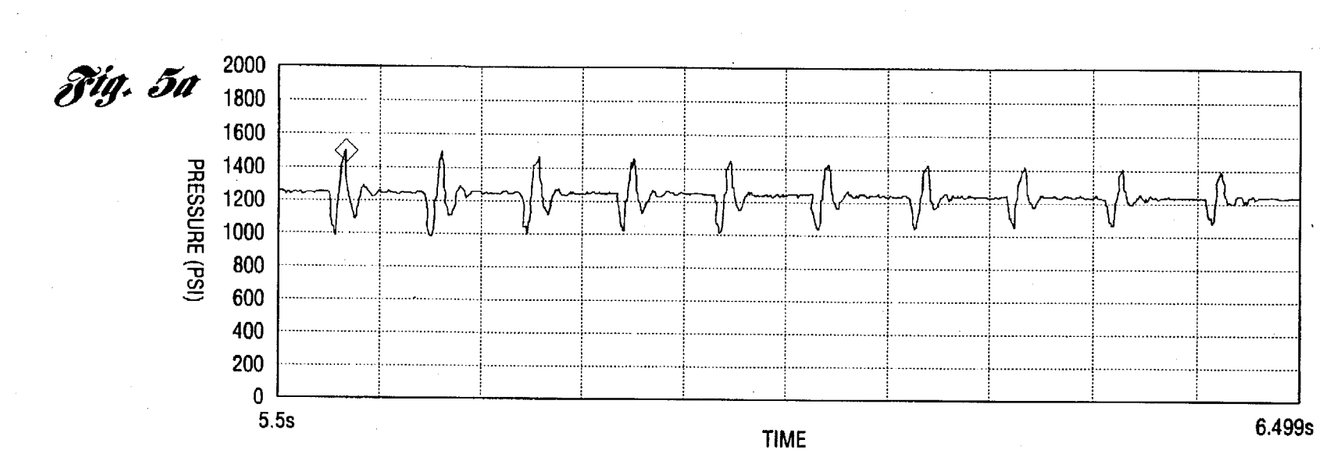
FIG. 5a is a plot of pressure versus time for the ABS system of FIGS. 1 and 3a during the reapply cycle.
Figure 5B:
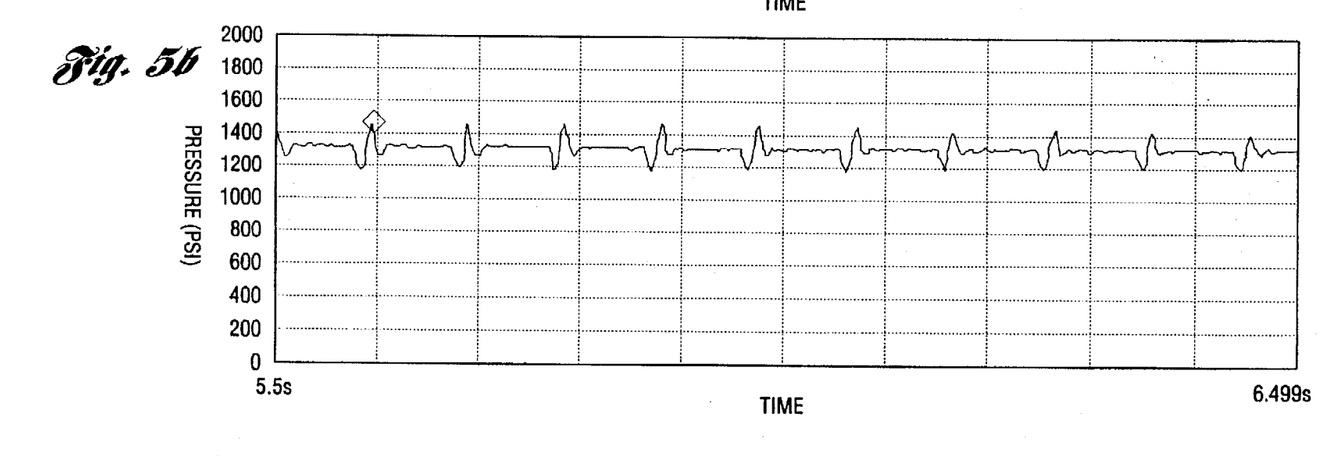
FIG. 5b is a plot of pressure versus time for the ABS system of the FIGS. 2 and 3b during the reapply cycle.
Figure 6A:
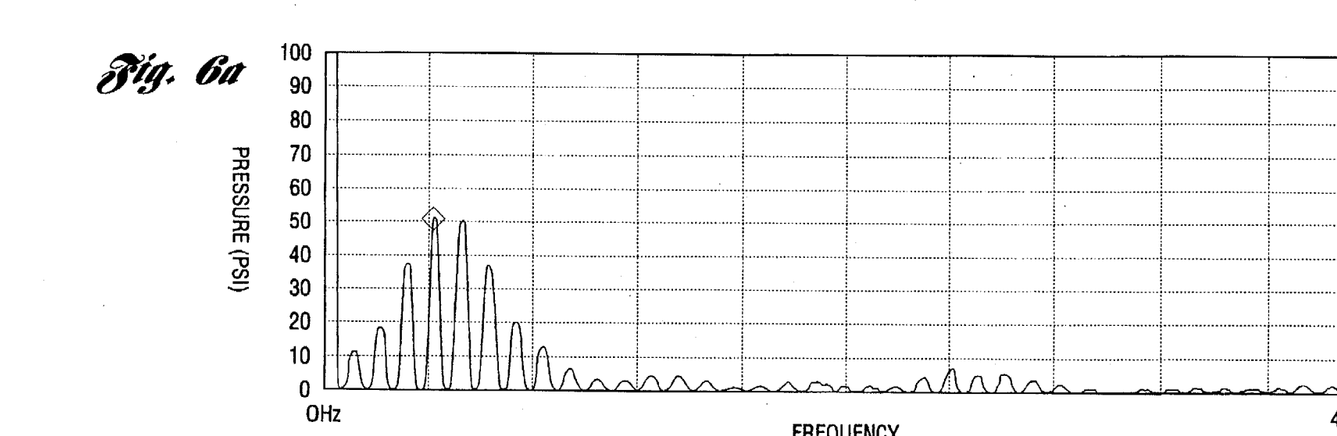
FIG. 6a is a plot of pressure versus frequency for the ABS system of FIGS. 1 and 3a during the reapply cycle.
Figure 6B:
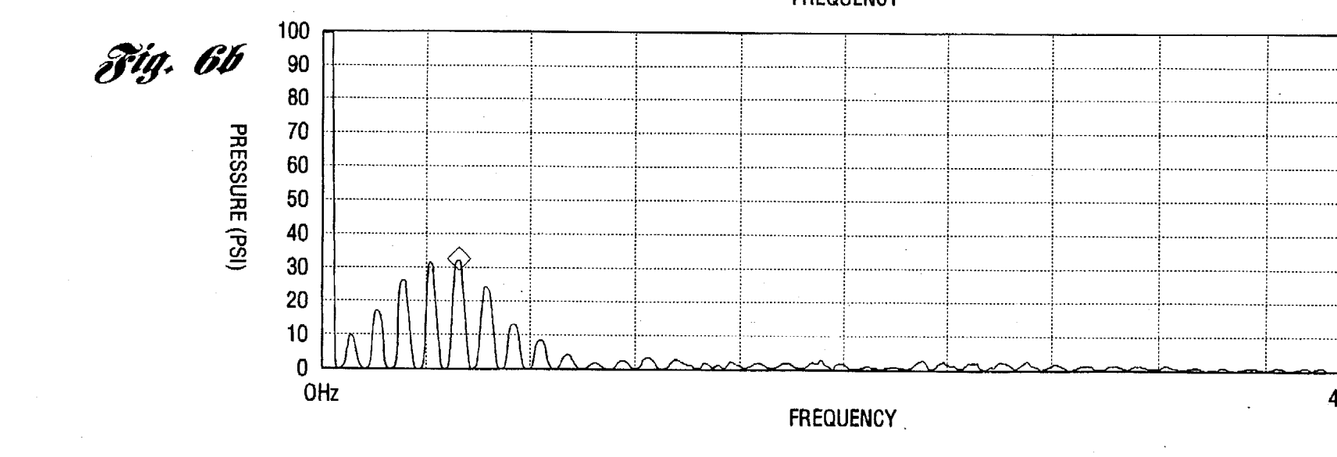
FIG. 6b is a plot of pressure versus frequency for the ABS system of FIGS. 2 and 3b during the reapply cycle.

FIG. 5a is a plot of pressure in the master cylinder line versus time for the conventional attenuator location (FIG. 2) during the brake reapply mode. In FIG. 5b, the same plot for the revised location of attenuator 305' shows considerably reduced amplitude of both pressure and rebound spikes. In FIGS. 6a and 6b are the corresponding pressure versus frequency plots for the hydraulic circuits of FIGS. 1 and 2, respectively. As can be seen, the pressure fluctuations of the major frequency components are considerably reduced by the attenuator circuit of the present invention.

Figure 7A:
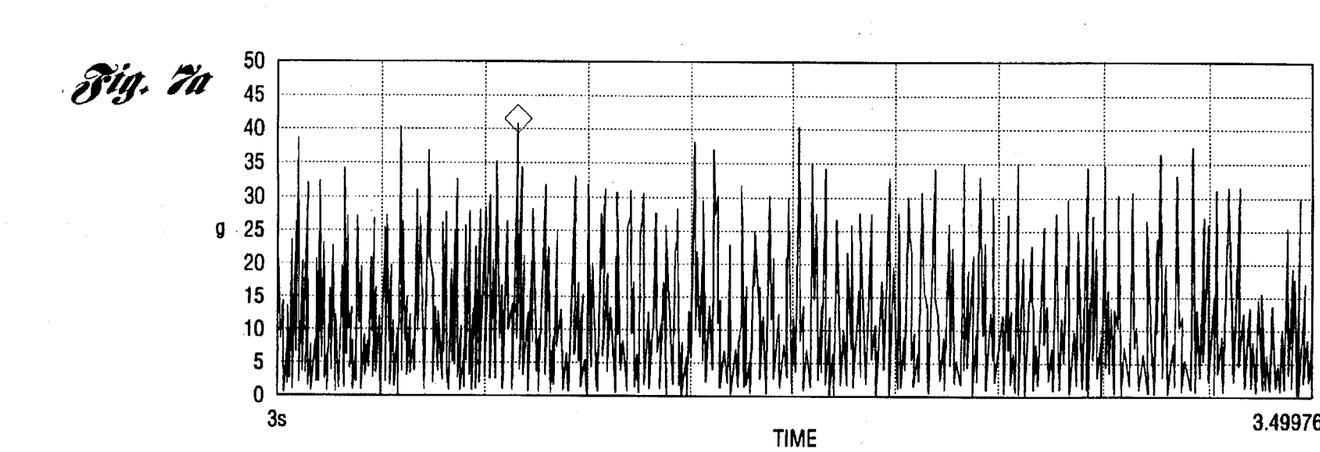
FIG. 7a is a plot of vibrational acceleration (g) versus time for the ABS system of FIGS. 1 and 3a during the dump cycle.
Figure 7B:
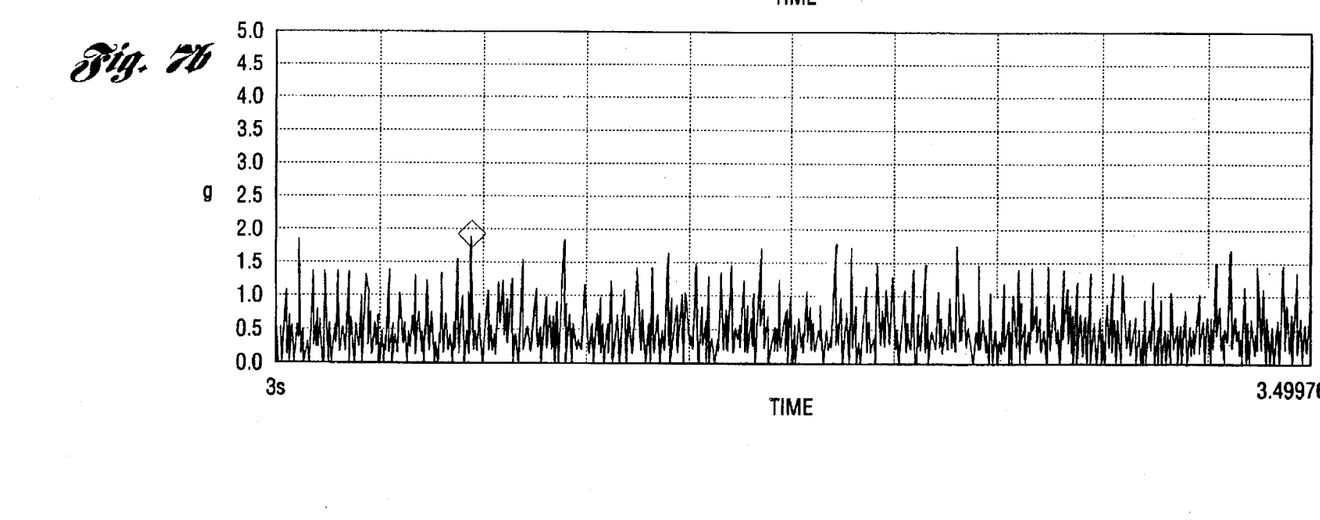
FIG. 7b is a plot of vibrational acceleration (g) versus time for the ABS system of FIGS. 2 and 3b during the dump cycle.
Figure 8A:
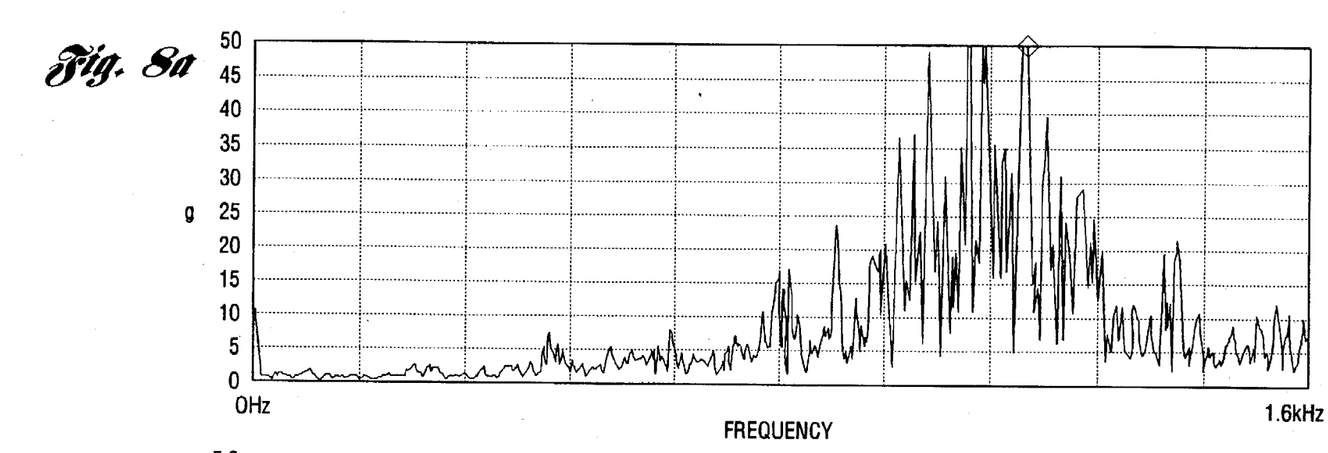
Figure 8B:
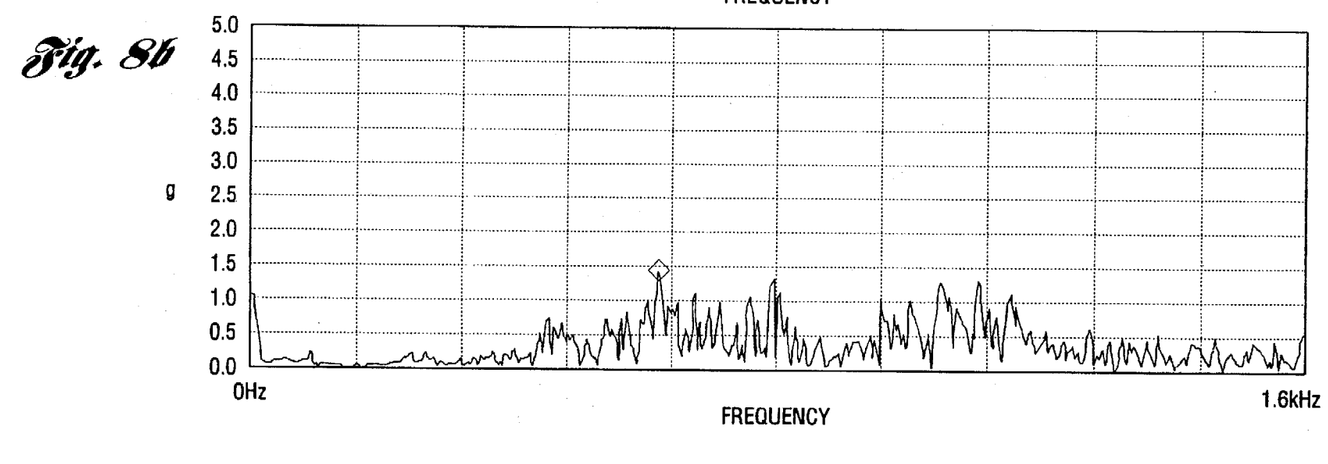
FIG. 8b is a plot of vibrational acceleration (g) versus frequency for the ABS system of FIGS. 2 and 3b.

In FIGS. 7a and 7b are illustrated the vibrational accelerations (in "g's", the gravitational constant) versus time in seconds(s) measured at the hydraulic control unit during the dump cycle for the conventional attenuator location (FIG. 1) and subject invention location (FIG. 2), while FIGS. 8a and 8b are analogous plots for the same vibrations plotted as vibrational acceleration (g) versus frequency. These Figures illustrate the substantial improvement made possible by the elastomeric, volumetrically compressible attenuator with flow-through location of the subject invention.

Comparing FIGS. 4a–8a with FIGS. 4b–8b, it is evident that the revised attenuator flow-through location is effective in reducing not only the high pressure pump pressure fluctuations and vibration, but also those emanating from other portions of the system. Moreover, the improvement is effectuated even when a larger diameter orifice is used. Larger diameter orifices would normally be expected to be less effective in damping pressure pulses and vibration. The ability to utilize a larger orifice is advantageous, since flow of fluid from and to the master cylinder is restricted by the orifice, and a small orifice may unduly limit brake pedal response both during brake application and release while in a non-ABS mode.

In one aspect of the invention, namely the flow-through location, the design of the attenuator itself is not critical, and may be simplified in design so as to be no more than a bore in the hydraulic control unit body capped with a suitable plug. As no reduced orifice-containing sleeve is necessary, the sleeve may be dispensed with, allowing the attenuator to enclose a higher volume and thus more damping fluid, be reduced in size for the same volume of fluid, or be both reduced in size as well as carrying a larger volume of fluid. The orifice size is selected with regard to other system parameters such as attenuator cavity volume and internal line volume. This selection may be made by one of ordinary skill in the art. Orifice sizes from 0.010 to about 0.040, preferably 0.015 to about 0.030, and most preferably about 0.025 are particularly useful.

However, in addition to hydraulic fluid filled attenuators, i.e., the piston/return spring type 305 shown in FIG. 3a, the attenuator cavity may be substantially filled, as shown in FIG. 3b, with a volumetrically compressible member. The use of a volumetrically compressible member, for example an elastomer, allows the designer to vary the pressure absorbing capacity and damping characteristics. Composite elastomers having portions of different volumetric compressibility and/or hysteresis may also be used to further smooth out pressure fluctuations. A suitable attenuator design is shown in FIG. 3b. Suitable elastomeric material is, for example, silicone rubber having a bulk modulus of 190,000 psi. The volumetrically compressible material should not occupy the entire cavity, but rather allow that fluid pressure may be exerted on all sides of the material so that its volume is compressed.

Thus, an improvement in damping characteristics is obtained by relocating the attenuator 4 to the master cylinder brake line 3 at the juncture with the pump outlet line as shown in FIGS. 2 and 3b, or upstream of that juncture toward the master cylinder as shown in dashed line in FIG. 2 and identified as attenuator 4', thus damping both the high pressure pump 7 as well as the isolation valve 5 and dump valve 9. The common attenuator is positioned between the master cylinder and the confluence of the high pressure pump outlet and isolation valve. By "confluence" is meant that point in the hydraulic circuit where the high pressure pump outlet and isolation valve inlet passages converge or meet.

Alternatively, by the attenuator may be located anywhere in the master cylinder line 3 between the master cylinder 2 and the isolation valve 5, the benefit being that normal bleeding of the line at the wheel cylinder can be utilized as the means of bleeding the attenuator, thus providing what may be referred to as a "flow-through" design.

In accordance with a further embodiment of the present invention, opposed, parallel check valves are located between the master cylinder and this confluence. The confluence may take place at the attenuator itself, with a passage from the pump outlet and isolation valve separately entering the attenuator cavity as shown in FIG. 3b, or the respective passages may converge on the side of the attenuator most remote from the master cylinder with only a single passage entering the attenuator from this direction as shown in dashed line in FIG. 2. Preferably, the attenuator is a flow-through design with entry of fluid from the master cylinder being separate from the entry of fluid from the high pressure pump and isolation valve.

Restrictive orifice 10, however, is in the path of the hydraulic circuit between the master cylinder and brake slave cylinder, and thus restricts fluid flow. The vehicle operator may discern the effect of the orifice in a somewhat slower pedal during brake application, and a somewhat slower return of the brake pedal to its normal position upon release of the brakes.

Figure 9:
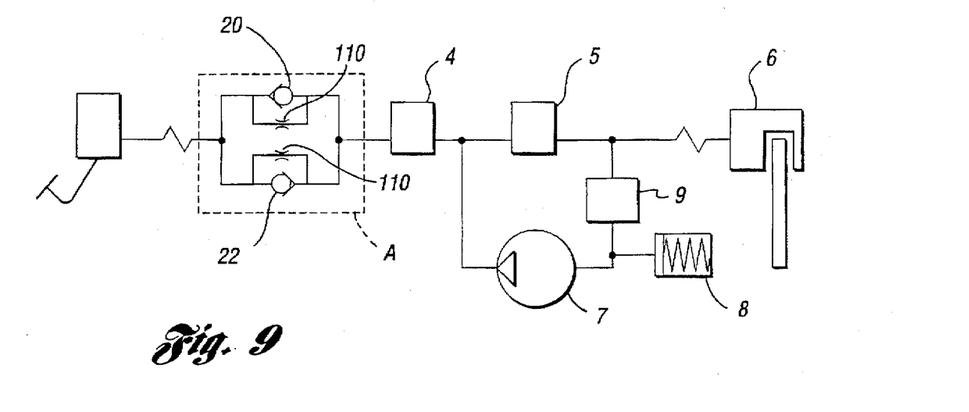
FIG. 9 schematically illustrates a further embodiment of the subject invention having a single attenuator in the master cylinder line upstream of the juncture of the pump outlet with the isolation valve feed line and opposed check valves in the master cylinder line upstream of the attenuator.

In FIG. 9, opposed parallel check valves 20 and 22 incorporate a restrictive orifice, shown as a pair of orifices 110, replacing the orifice 10 of FIG. 2. The check valves are preloaded to a higher closing pressure than expected of normal pressure pulses, and thus remain closed during ABS cycling. In these cycles, the normally open isolation valve 5 closes and normally closed hold/dump valve 9 opens, allowing fluid to be dumped from the brake slave cylinder 6, releasing the brakes. The isolation valve then reopens and the hold/dump valve closes, permitting fluid from the high pressure pump and/or master cylinder to flow to the brake slave cylinder, reapplying the brakes. The normal maximum pressure pulse during such cycles is on the order of 250 psi, and thus check valves 20, 22 preloaded to 300 psi will not open during ABS cycling. The combination of the attenuator 4, the associated restrictive orifice 110 and the opposed parallel check valves 20, 22 will effectively damp system pressure pulses and vibration.

Figure 10:
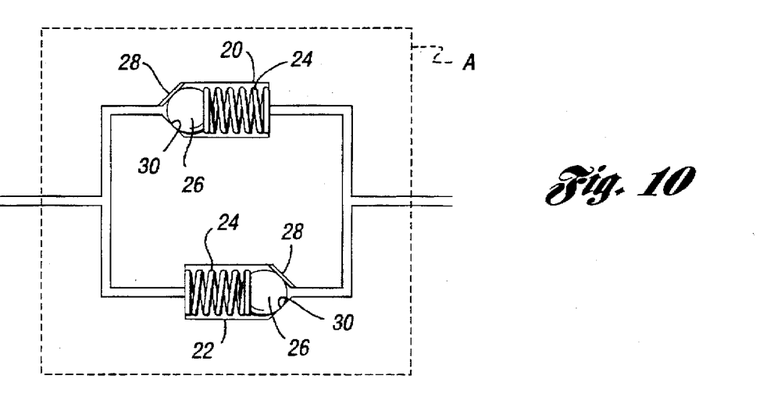
FIG. 10 is an enlarged segment of the dashed portion A of the FIG. 9.

As shown in greater detail in FIG. 10, the opposed parallel check valves 20 and 22 may be identical, but oppositely disposed. Each contains a check valve spring 24 and check ball 26. Grooves 28 are provided in the check ball seats 30. These grooves are dimensioned to be collectively equivalent to the appropriate reduced size restrictive circular orifice 10. For example, an appropriate orifice 10 may have a diameter of 0.020 inches and the two grooves 28 should together have the same flow rate as a 0.020 inch orifice in this example. Alternatively, in the device shown in FIG. 10, one check valve may have a slightly enlarged groove, itself equivalent to the designed orifice size, while the remaining check valve has no groove. In this case, it would be preferred to have the one groove 28 located at check valve 26. Preferably, both check valves contain such grooves or their equivalents. In operation, the grooves, as restrictive orifices, act in conjunction with the attenuator proper to damp pressure pulses and vibrations. Under slight application of brake pressure, fluid may flow from the master cylinder or back to the master cylinder through the grooves. With more severe application of brake pedal force, however, the check ball 26 of check valve 20 will be lifted off its seat, providing a high volume fluid passage. Upon quick release of the brake pedal, the momentary greater pressure in the brake slave cylinder may force check ball 26 of check valve 22 off its seat while the corresponding check ball of check valve 20 is tightly seated. High volume flow of fluid in the reverse direction is thus permitted.

Figure 11:
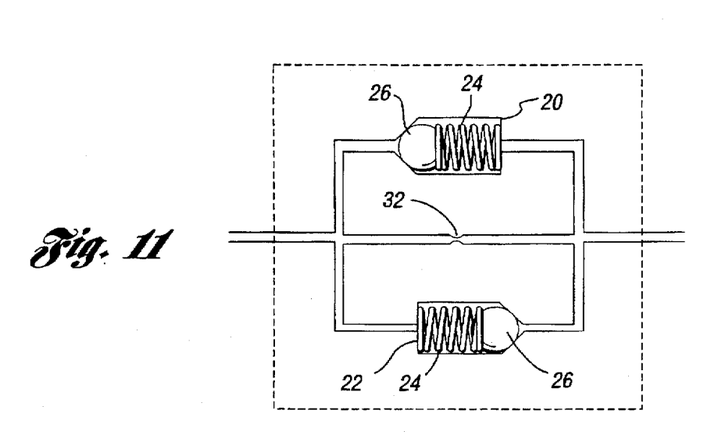
FIG. 11 is a view similar to FIG. 9 and showing a further embodiment of the opposed check valves of the subject invention.

In FIG. 11, a further embodiment of the subject invention is shown. The elements of the device are numbered as in FIG. 10. However, in FIG. 11, the grooves in the check ball seats are dispensed with. A common reduced size orifice 32 performs the function of the grooves. During operation, reduced size orifice 32 in conjunction with the attenuator proper, serves to damp pressure fluctuations and vibrations in the system. During low volume flow, the check valves may remain closed, flow being through orifice 32. However, upon sudden application or release of brake pedal pressure, check valves 20 and 22 will open, allowing high volume fluid flow, as in FIG. 10.

The term "opposed, parallel" pertaining to the check valves as used herein, indicates that the check valves referred to are in parallel in the hydraulic circuit with which they are associated, each check valve permitting fluid flow in one direction, the combination thus allowing fluid flow in both directions to and from the master cylinder. The check valves may be located in any convenient location in the vehicle control system. They may, for example, be located in the master cylinder assembly; be located in a separate module between the master cylinder and the hydraulic control unit; or preferably, be contained in the hydraulic control unit itself within the master cylinder, separate module, or hydraulic control unit, the check valves may be located (i) within the same bore with appropriate bypass and connecting passages, (ii) in separate, parallel bores or (iii) transverse to each other. The terms "opposed" and "parallel" pertain to the function of the check valves, not their physical arrangement or location.

Preferably, the check valves are of the check ball type, preloaded against their corresponding check ball seats by a check ball spring having a preload that is equal to or greater than the pressure spikes and/or rebound pulses which emanate from the high pressure pump and/or isolation valves and/or hold/dump valves. The seats against which the check balls rest are preferably generally conical, preferably coined by a ball of somewhat larger diameter. Where the reduced size orifice is a groove 28 in the seat, it is preferably a U-shaped groove machined or pressed by a tool into the seat. For example, in an aluminum hydraulic control unit body where the opposed, parallel check valves are located in the hydraulic control unit proper, the seats and grooves may be formed at the same time by a hard steel conical or spherical tool having a raised portion corresponding to the groove.

Where the seat of the check ball is not conical or spherical, but instead is simply a reduced bore or its equivalent, the reduced bore may have a notch or passage machined or pressed into its inner circumference. Alternatively, the check ball seating surface may, instead of a groove, contain a reduced size bore offset from the fluid passage out of the check valve, the reduced size bore communicating with the fluid passage.

One may machine or press a seat which does not totally conform to the shape of the check ball such that leakage past the check ball is ensured, the amount of leakage corresponding to the fluid flow expected of a reduced size orifice having a circular cross-section of from 0.005 to about 0.030 inches, preferably 0.015 to about 0.025 inches. By the term "circular cross-section" with reference to the check ball seat is meant the variety of seats which are commonly used with check balls, i.e. conical, reduced bore, spherical, etc. Suitable non-conforming seats are, for example, ellipsoidal, or modified conical or spherical surfaces whose diameter or depth vary in radial direction as a radius is rotated about the geometric axis of the check ball and/or fluid passage. The term "circular cross-section" includes such variants. By "closed condition" is meant the position where the check valve or check ball allows minimal or no fluid flow by virtue of being proximate to its seat.

While the best mode for carrying out the invention has been described in detail, those familiar with the art to which this invention relates will recognize various alternative designs and embodiments for practicing the invention as defined by the following claims.

What is claimed is:

1. A hydraulic circuit suitable for an anti-lock braking system, comprising:

a brake pedal-actuated master cylinder for supplying pressurized fluid through a master cylinder line to at least one brake slave cylinders when actuated;

a normally-open isolation valve through which said pressurized fluid flows, said isolation valve located between said master cylinder and said slave cylinder and in fluid communication with each through said master cylinder line;

a normally-closed hold/dump valve having an inlet and an outlet, the inlet communicating with said master cylinder line between said isolation valve and said slave cylinder, said hold/dump valve when open providing a means of escape of pressurized fluid from said slave cylinder when said isolation valve is closed;

a high pressure pump having an inlet and an outlet and capable of supplying high pressure fluid through said pump outlet to a point in said circuit such that said isolation valve, when closed, prevents flow of high pressure fluid to said slave cylinder, said pump inlet communicating with said hold/dump valve outlet;

an attenuator comprising a cavity containing a compressible substance, at least two inlet/outlet passages, and an orifice of reduced size relative to said inlet/outlet passages, said attenuator cavity being positioned in said circuit such that fluid to said slave cylinder from said high pressure pump and from said master cylinder must pass through said attenuator cavity, said orifice being positioned between said attenuator cavity and said master cylinder such that the high rise in fluid pressure caused by the operation of said high pressure pump is reduced in amplitude by said attenuator in combination with said orifice.

2. The hydraulic circuit of claim 1 further comprising a low pressure accumulator, said accumulator having an inlet passage positioned to receive fluid from said hold/dump valve when said hold/dump valve is actuated.

3. The hydraulic circuit of claim 2 wherein said low pressure accumulator is in fluid communication with said pump outlet.

4. The hydraulic circuit of claim 1 wherein said compressible substance comprises hydraulic fluid.

5. The hydraulic circuit of claim 1 wherein said compressible substance comprises an elastomer.

6. The hydraulic circuit of claim 1 wherein said attenuator cavity contains first and second inlet/outlet passages, said first inlet/outlet passage communicating with said orifice, said second inlet/outlet passage communicating with said pump outlet and said isolation valve.

7. The hydraulic circuit of claim 1 wherein said attenuator cavity contains first, second and third inlet/outlet passages, said first inlet/outlet passage communicating with said orifice, said second inlet/outlet passage communicating with said high pressure pump, and said third inlet/outlet passage communicating with said isolation valve.

8. The hydraulic control circuit of claim 7 wherein said second and third inlet/outlets of said attenuator share a common bore into said attenuator cavity.

9. The hydraulic circuit of claim 1 further comprising:

a normally closed first check valve in said line upstream of said attenuator permitting flow from the master cylinder toward said at least one brake slave cylinders;

a normally closed second check valve in said line upstream of said attenuator and in a parallel flow around said first check valve permitting flow from said at least one slave cylinders toward said master cylinder; and a restrictive orifice in said master cylinder line, the flow of hydraulic fluid through said restrictive orifice being independent of the closed position of said first and second check valves.

10. The hydraulic circuit of claim 9 wherein at least one of said first and second check valves comprises a ball-type check valve, the ball of said ball-type check valve abutting a check ball seat of circular cross-section in its closed condition, said restrictive orifice including at least one groove in said check ball seat, such that fluid may flow through said groove when said check valve is in its closed position.

11. The hydraulic circuit of claim 10 wherein both of said check valves are ball-type check valves and both of said check ball seats contain at least one of said grooves.

12. The hydraulic circuit of claim 11 wherein at least one of said check balls is tensioned against said check ball seat by a check ball spring, said spring having a force equal to or greater than the average pressure of pressure pulses and rebound pulses associated with a high pressure pump and isolation valve of a vehicle control system.

13. A hydraulic circuit suitable for use in an anti-lock brake system, comprising:

a primary brake pedal-actuated hydraulic circuit comprising a brake pedal actuated master cylinder communicating hydraulically with a brake slave cylinder, said master cylinder supplying pressurized fluid to said brake slave cylinder when actuated by said brake pedal;

an anti-lock brake dump/reapply loop, said dump/reapply loop comprising a normally-open isolation valve in common with said primary hydraulic circuit and said dump/reapply loop, said isolation valve located in said primary hydraulic circuit between said master cylinder and said brake slave cylinder;

a normally-closed hold/dump valve having an inlet and an outlet, said inlet communicating with said primary hydraulic circuit between said isolation valve and said brake slave cylinder;

a high pressure pump having an inlet and an outlet, said outlet of said hold/dump valve communicating with said inlet of said high pressure pump, said outlet of said high pressure pump communicating with said primary hydraulic circuit at a point such that fluid from said high pressure pump outlet must pass through said isolation valve prior to entering said brake slave cylinder;

an attenuator cavity having at least first and second inlet/outlet passages and positioned in said primary hydraulic circuit, said first inlet/outlet passage communicating with said master cylinder, said second inlet/outlet passage communicating with said high pressure pump;

an orifice of reduced diameter with respect to the diameters of said inlet/outlet passages of said attenuator, said orifice being positioned in said primary hydraulic circuit between said master cylinder and said attenuator cavity.

* * * * *